UNITED STATES PATENT OFFICE.

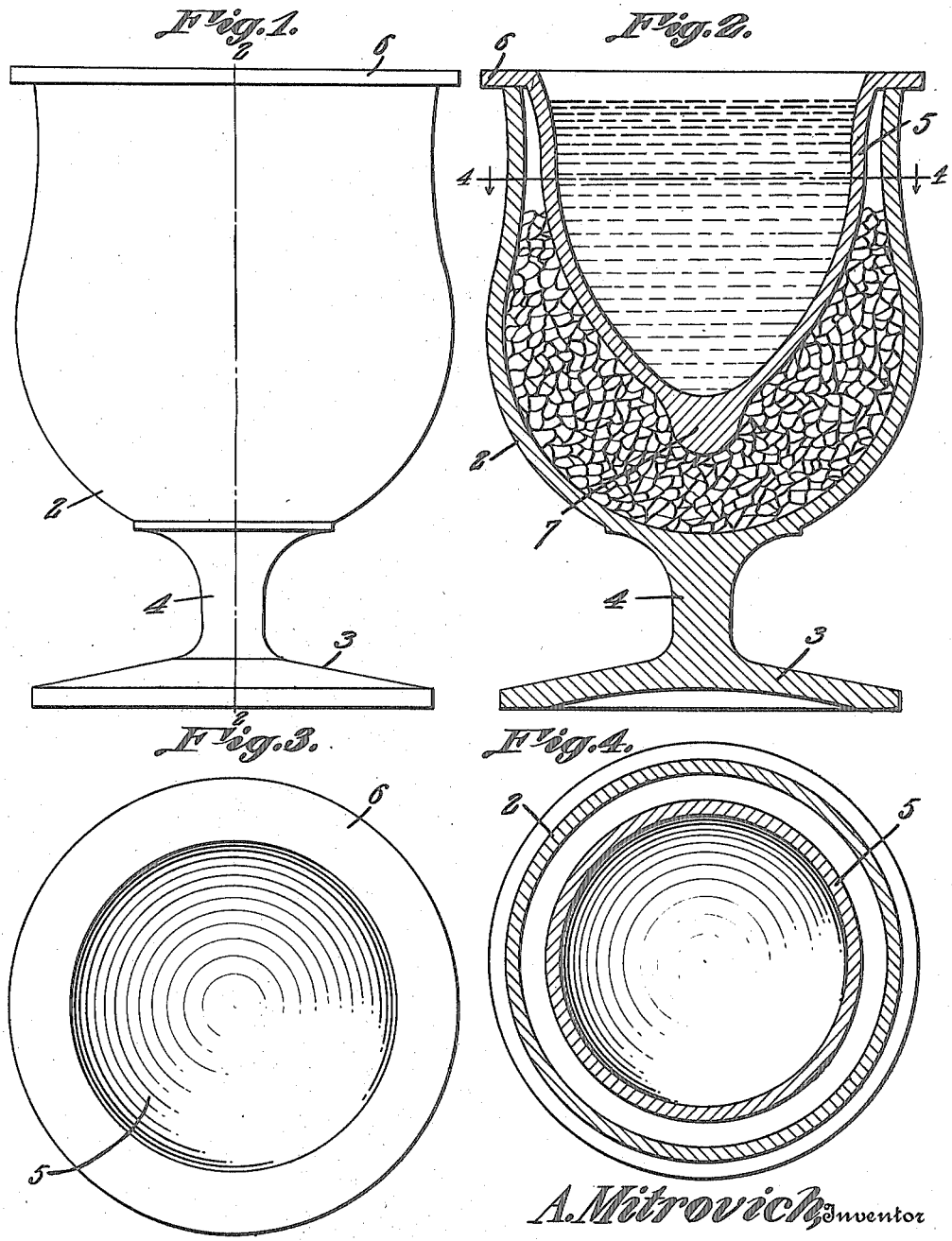

ADOLPH MITROVICH, OF SAN ANTONIO, TEXAS.

GLASS.

1,393,235.   Specification of Letters Patent.   Patented Oct. 11, 1921.

Application filed May 10, 1919. Serial No. 296,120.

*To all whom it may concern:*

Be it known that I, ADOLPH MITROVICH, (who is a citizen of Jugo-Slavia,) residing at San Antonio, in the county of Bexar and State of Texas, have invented new and useful Glasses, of which the following is a specification.

This invention relates to improvements in glasses, the object of the invention being to provide an improved double receptacle for serving shrimp, oyster and other so-called cocktails, so constructed that the ice in the outer or lower receptacle is protected from the action of the air and from spilling and the inner receptacle readily adjusts itself to the ice in the lower or outer receptacle.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,—

Figure 1 is a side elevation of my improved glass;

Fig. 2 is a vertical section taken on the line 2—2 of Fig. 1, showing the receptacle filled;

Fig. 3 is a plan view of the glass; and

Fig. 4 is a cross section thereof, taken on the line 4—4 of Fig. 2.

The same characters of reference designate the same parts in the different figures of the drawings.

The method in general use in hotels, restaurants, etc., of serving oyster, crab, shrimp and other cocktails is to put the ordinary cocktail glass in a plate or bowl of crushed ice, which method is not only awkward, but a wide space is formed between the upper edges of the glass and plate or bowl so that the ice quickly becomes melted by the action of the air thereon and the water thus formed is easily spilled. Moreover, the receptacles being unadapted to coöperate together, the inner one is very easily shifted to such an angle that the ice water very frequently gets over the top and is likely to spoil the contents thereof.

The object of the present invention is to overcome all of these objections and to provide a pair of receptacles which are constructed so as to coöperate together to keep the inner receptacle properly seated at all times and the space between the upper edges of the receptacles closed, whereby air is excluded from the ice so that it will remain solid for a much longer time and the water formed in the outer receptacle is not easily spilled.

Referring to the drawings, 2 designates an outer or lower receptacle of comparatively large size, preferably in the form of an ordinary or flangeless glass having a base 3 connected to the receptacle proper by means of a pedestal or leg 4. Adapted to coöperate with this receptacle I have provided an inner receptacle 5 for the reception of the cocktail, and which receptacle is provided around its upper edge with a circumferential flange 6 adapted to project over the edge of the outer receptacle and form a comparatively tight joint therewith, the receptacles being so shaped as to provide a space therebetween to receive cracked ice, the inner and outer receptacles being formed on different arcs eccentric to each other for this purpose. The receptacle 5 is preferably of inverted cone shape, as shown in Fig. 2, and is provided exteriorly thereof, approximately at the apex of the cone with a thickened projection forming a lug or spur 7 that is adapted to push its way down through the ice in the outer receptacle and cause the ice to so form around the inner receptacle that the same is always maintained in an upright position.

In the use of these devices it is sometimes necessary that the cocktails stand a considerable time after having been prepared, and where the ice is unprotected against the action of the air its melts very fast. It will be seen from the foregoing description that I have provided a structure which shuts out the air and thus not only protects the ice against melting, but when it is melted the flange of the inner receptacle will prevent the slopping over of the water. An additional advantage inherent in the structure herein described is the fact that, owing to the formation of the outer receptacle it can be taken hold of by the waiter by means of the leg or pedestal without marring the frost that may have formed on the outside of the glass. This is a very desirable feature in devices of this kind, since the formation of frost on the outside of the receptacle presents a very attractive appearance and an effort is always made to preserve such formation when serving the order.

While I have described in detail the structure herein illustrated, it is to be understood that I do not thereby limit my invention to the precise features of construction shown, as I am aware that many mechanical changes and modifications may be made therein without departing from the spirit and scope of the invention as set forth in the claims appended hereto.

Having thus described my invention, what I claim is:

1. A cocktail glass comprising an inner and a flangeless outer receptacle, the inner receptacle having a flat circumferential flange adapted to close the upper end of the outer receptacle and an exterior spur at its lower end to assist in maintaining said inner receptacle in upright position, the outer receptacle being provided with means for permitting the glass to be carried without the necessity of handling the receptacle proper and said receptacles being formed on different arcs eccentric to each other to provide a space therebetween of annular formation narrowing toward and extending to said flange.

2. A glass comprising an inner downwardly tapering and globular-like receptacle and having outwardly extending horizontal circumscribing flange of uniform thickness, and an outer receptacle of substantially globular formation having its upper portion of reduced formation and presenting a flangeless edge horizontally disposed to engage the bottom face of said flange in close proximity to the inner receptacle, thereby presenting a very narrow channel between the receptacles at their upper portions and a wide channel of substantially double reniform shaped cross section at the major lower portions thereof, said outer receptacle having a pedestal provided with a base for gripping and supporting the glass without the necessity of handling the receptacle proper.

In testimony that I claim the foregoing as my own, I have hereto affixed my signature in the presence of two witnesses.

ADOLPH MITROVICH.

Witnesses:
   AGNES MILLER,
   J. I. KERCHEVILLE.